(12) United States Patent
Gupta et al.

(10) Patent No.: US 11,926,322 B2
(45) Date of Patent: Mar. 12, 2024

(54) HYBRID DETERMINISTIC OVERRIDE OF PROBABILISTIC ADVANCED DRIVING ASSISTANCE SYSTEMS (ADAS)

(71) Applicant: TOYOTA MOTOR ENGINEERING & MANUFACTURING NORTH AMERICA, INC., Plano, TX (US)

(72) Inventors: Rohit Gupta, Santa Clara, CA (US); Yanbing Wang, Nashville, TN (US); Ziran Wang, San Jose, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 214 days.

(21) Appl. No.: 17/398,666

(22) Filed: Aug. 10, 2021

(65) Prior Publication Data

US 2023/0048774 A1  Feb. 16, 2023

(51) Int. Cl.
*B60W 50/00* (2006.01)
*B60W 30/16* (2020.01)

(52) U.S. Cl.
CPC ...... *B60W 30/162* (2013.01); *B60W 50/0098* (2013.01); *B60W 2050/0095* (2013.01); *B60W 2420/52* (2013.01); *B60W 2520/10* (2013.01); *B60W 2520/105* (2013.01); *B60W 2540/30* (2013.01); *B60W 2554/4041* (2020.02); *B60W 2554/4042* (2020.02); *B60W 2554/802* (2020.02); *B60W 2556/10* (2020.02); *B60W 2556/45* (2020.02); *B60W 2710/18* (2013.01)

(58) Field of Classification Search
None
See application file for complete search history.

(56) References Cited

U.S. PATENT DOCUMENTS

| | | | | |
|---|---|---|---|---|
| 11,138,349 | B2 * | 10/2021 | Mizuta | G06F 30/20 |
| 2020/0249699 | A1 * | 8/2020 | Kim | G08G 1/22 |
| 2020/0324766 | A1 * | 10/2020 | Zhao | B60W 30/16 |
| 2020/0324768 | A1 * | 10/2020 | Switkes | B60W 30/162 |
| 2020/0384997 | A1 * | 12/2020 | Lacaze | G05D 1/0295 |

(Continued)

OTHER PUBLICATIONS

Bernarrdini, et al., "Combining Temporal Planning with Probabilistic Reasoning for Autonomous Surveillance Mission", Auton Robot, Mar. 2015, pp. 181-203, https://link.springer.com/article/10.1007/s10514-015-9534-0.

(Continued)

*Primary Examiner* — James M McPherson
(74) *Attorney, Agent, or Firm* — Oblon, McClelland, Maier & Neustadt, L.L.P.

(57) ABSTRACT

A hybrid deterministic override to cloud based probabilistic advanced driver assistance systems. Under default driving conditions, an ego vehicle is controlled by a probabilistic controller in a cloud. An overall gap between the ego vehicle and a leading vehicle is divided into an emergency collision gap and a driver specified gap. The vehicle sensors monitor the overall gap. When the gap between the ego vehicle and the leading vehicle is less than or equal to the emergency collision gap, a deterministic controller of the ego vehicle overrides the cloud based probabilistic controller to control the braking and acceleration of the ego vehicle.

9 Claims, 7 Drawing Sheets

(56) References Cited

U.S. PATENT DOCUMENTS

| | | |
|---|---|---|
| 2021/0018322 A1 | 1/2021 | Jiang et al. |
| 2021/0174687 A1* | 6/2021 | Sasmal .................... G08G 1/22 |
| 2023/0135207 A1* | 5/2023 | Schuh .................... G08G 1/163 |
| | | 342/70 |

OTHER PUBLICATIONS

Anderson, et al., "On-Demand Trajectory Predictions For Interaction Aware Highway Driving", arXiv:1909.05227, Mar. 2020, 8 pages.

\* cited by examiner

HYBRID DETERMINISTIC OVERRIDE OF PROBABILISTIC ADVANCED DRIVING ASSISTANCE SYSTEMS (ADAS)

FIELD OF THE INVENTION

Aspects of the present disclosure describe a hybrid adaptive cruise control system of a vehicle which takes advantage of probabilistic ADAS during normal driving situations, and overrides the probabilistic ADAS and switches to a deterministic controller located in the vehicle during conditions of sudden acceleration or unintended acceleration.

DESCRIPTION OF THE RELATED ART

Adaptive cruise control (ACC) systems increase driver safety and confidence by utilizing front-facing sensors to detect the size, speed, and range of interfering objects, such as surrounding vehicles. In the instance where the driver of a vehicle chooses to utilize ACC for longitudinal control, the ACC can generate a command to alter the speed of the vehicle in order to maintain a safe inter-vehicle driving distance (also referred to as the gap between vehicles).

Human-like driving exhibits a variety of subtleties which are difficult to encode manually in a controller design. A personalized adaptive cruise control design can use a data-driven controller based on Gaussian Process (GP) regression such that a controlled vehicle-following dynamic matches the driver's naturalistic vehicle-following styles, and hence can reduce the times when the driver overrides the system (by stepping on the acceleration pedal or braking pedal). However, in real life applications, such as in electronic systems that assist drivers in driving and parking functions, a probabilistic-only system cannot guarantee safety, given concerns about sudden acceleration or unintended acceleration. While theoretically, probabilistic algorithms may be as reliable as deterministic algorithms, there is always doubt. Additionally, a probabilistic algorithm, especially when accessed from a cloud, cannot make decisions in real time to address the conditions of sudden acceleration or unintended acceleration safely due to longer computation times and transmission times. A deterministic controller, which is part of the adaptive cruise control of the vehicle, can make decisions in real time and is better suited to address these emergency situations.

Accordingly, it is one object of the present disclosure to provide methods and systems for a hybrid adaptive cruise control system which takes advantage of a cloud based probabilistic ADAS during normal driving situations, and overrides the probabilistic ADAS and switches to a deterministic controller located in the vehicle.

SUMMARY

Aspects of the present disclosure describe a hybrid adaptive cruise control system which includes a probabilistic controller having a personalized advanced driver-assistance system (ADAS) which operates the adaptive cruise control system of a vehicle during normal driving conditions; and a deterministic controller, located in the vehicle, which overrides the probabilistic controller during unsafe or uncertain driving conditions.

In a first embodiment, a method for controlling an ego vehicle equipped with advanced driver assistance is described, comprising receiving an input of a personalized gap of the ego vehicle; determining an emergency collision gap between the ego vehicle and a leading vehicle; when the personalized gap is greater than the emergency collision gap, controlling the ego vehicle by a cloud based probabilistic controller; and when the emergency collision gap is greater than or equal to the personalized gap, overriding the cloud based probabilistic controller and controlling the ego vehicle by a deterministic controller of the ego vehicle.

In a second embodiment, a system for controlling an ego vehicle equipped with advanced driver assistance is described, comprising a deterministic controller located in the ego vehicle, wherein the deterministic controller is configured to generate control signals to actuate a braking controller and a throttle controller under unsafe or uncertain driving conditions; a cloud based probabilistic controller configured to generate desired acceleration signals under emergency driving conditions; a cloud based probabilistic controller configured to generate desired acceleration signals during default driving conditions; and a mode switch located in the deterministic controller, the mode switch configured to override the desired acceleration signals generated by the cloud based probabilistic controller during the emergency driving conditions.

In a third embodiment, an ego vehicle equipped with advanced driver assistance is described, comprising: a deterministic controller, wherein the deterministic controller is configured to generate control signals to actuate a braking controller and a throttle controller under emergency driving conditions; a cloud based probabilistic controller configured to generate desired acceleration signals during default driving conditions; and a mode switch located in the deterministic controller, the mode switch configured to override the desired acceleration signals generated by the cloud based probabilistic controller during the emergency driving conditions.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
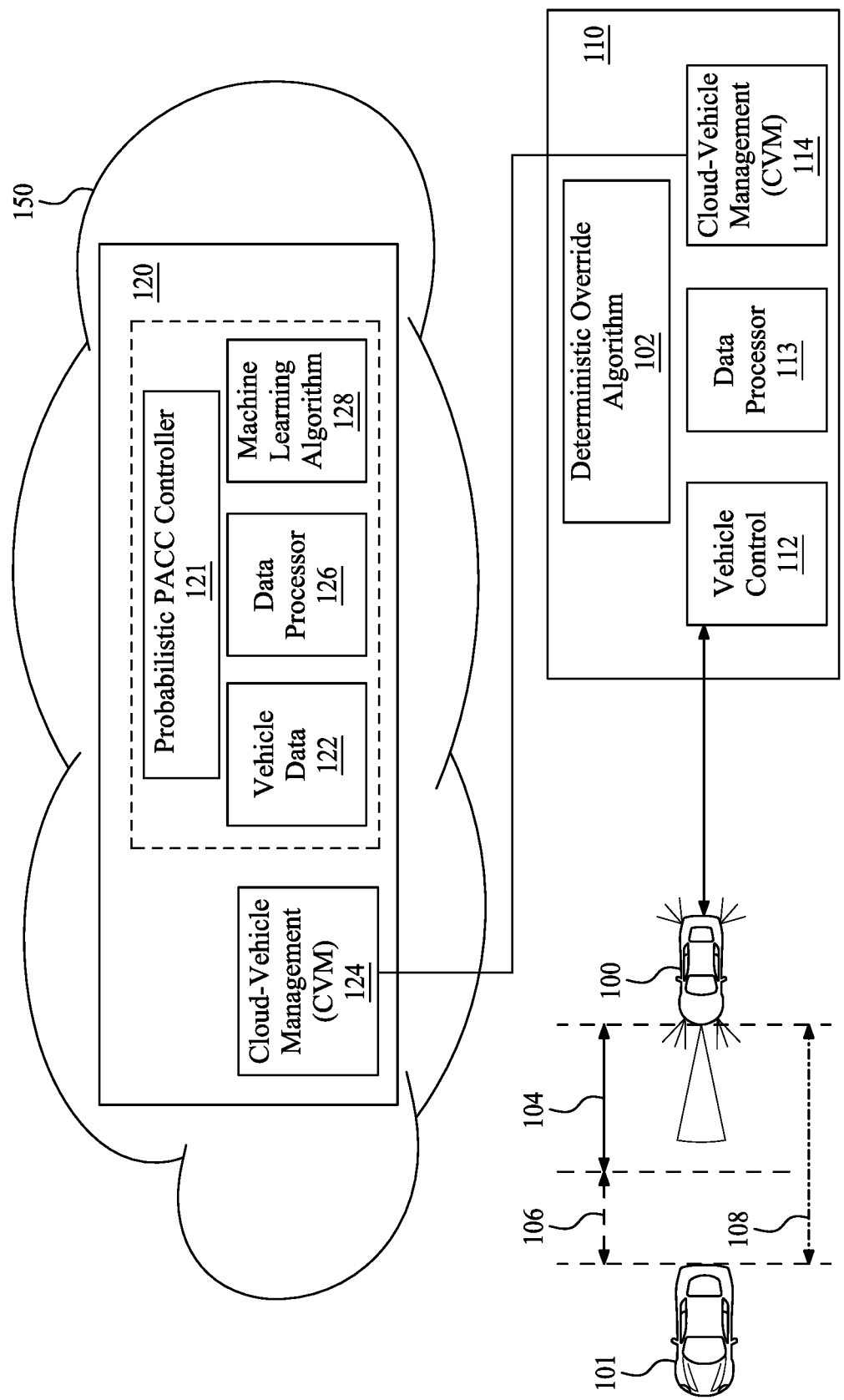
FIG. 1A illustrates a hybrid ADAS system, according to certain embodiments.

Referring now to the drawings, wherein like reference numerals designate identical or corresponding parts throughout the several views.

In the present disclosure, a deterministic override algorithm is added to a cloud-based probabilistic ADAS system. A cloud-based probabilistic data driven ADAS system is disclosed in co-pending and commonly owned U.S. Ser. No. 17/387,045, filed on Jul. 28, 2021, titled: "Gaussian Process Personalized Adaptive Cruise Control (GP-PACC), which is hereby incorporated by reference.

The cloud-based probabilistic data driven ADAS system stores each driver's driving profile in the cloud as a set of parameters. These parameters can be updated over time to provide a personalized driver profile, which is transmitted to the vehicle to provide personalized control of the vehicle. However, the computational time requirement of ADAS systems and time lost during communication of data to and from the probabilistic data driven ADAS system and the vehicle may add uncertainty during emergency situations, as the probabilistic data driven ADAS system may not be able make decisions in real time to address driving conditions of sudden acceleration or unintended acceleration. A deterministic controller, which is part of the adaptive cruise control of the vehicle, can make decisions in real time and is better suited to address these emergency situations.

The deterministic override eliminates the uncertainty in ADAS systems caused by probabilistic models by overriding the cloud-based probabilistic data driven ADAS system and taking control in real time during emergency situations. Elimination of the uncertainty ensures safer driving. The deterministic controller offers advanced driving features, for example, driver personalized preferences for gaps between vehicles.

In recent years, modelling and evaluating uncertainties have become important issues in many real-world problems. Three types of sources for the uncertainty, for example, in engineering analysis are: (1) physical uncertainty or inherent variability, which is generally quantified by a probability distribution estimated from observed data. (2) statistical uncertainty, which is related to an uncertainty in a set of statistical distribution parameters of random variables due to an insufficiency of data, (3) modelling uncertainty, which exists in model accuracy and model selection, and is commonly related to deviations between the real world and its representation in models. These deviations come from two sources: the limitation of a modeler's knowledge and a deliberate simplification introduced by the modeler.

Risk evaluation of existing ADAS systems under uncertainty and validation of future ADAS functions requires new approaches to analyze a plurality of parameter settings. A rising situation complexity, together with the sparsity of events (e.g. one fatal accident per over 100 million driven miles) that can be used for a statistical validation of a system in the real world operation, leads to prohibitively high testing costs. Thus, validation of ADAS systems under uncertainty is difficult.

The present disclosure describes method and systems to eliminate the uncertainty due to delays in analysis related to computational complexity of cloud-based probabilistic models by using deterministic advanced driving control to override the cloud-based probabilistic data driven ADAS system under uncertainty. The deterministic system is user friendly and inexpensive to test, unlike the probabilistic systems.

In the present disclosure, the term ego vehicle refers to a subject vehicle which is equipped with a hybrid ADAS system, as disclosed herein. The ego vehicle may be any type of vehicle. For example, the ego vehicle may include one of the following types of vehicles: a car; a truck; a sports utility vehicle; a bus; a semi-truck; an autonomous vehicle; or any other roadway based conveyance. Further, the ego vehicle 110 may be a connected vehicle that includes a communications device and is capable of communicating with other endpoints through a communications network.

In the present disclosure, the term cloud refers to the on-demand availability of computer system resources, especially data storage (cloud storage) and computing power, without direct active management by a user.

In aspects of the present disclosure, a driver may input personalized gap information into a computer interface of his vehicle, such as a desired distance between his vehicle and a leading vehicle. For example, the driver may desire that a personalized gap be two car lengths at 40 mph, three car lengths at 60 mph, 20 feet from another vehicle, 30 feet from another vehicle, or the like. This personalized gap information may be transmitted to the probabilistic data driven ADAS system, which may integrate the personalized gap information into the personalized driver profile.

The hybrid ADAS system of the present disclosure has the following characteristics.

An in-vehicle deterministic control override algorithm in a deterministic controller. The deterministic controller includes an in-vehicle machine learning (ML) model which enables fast responses due to lower latency as compared to a cloud-based probabilistic controller. The in-vehicle machine learning model is deterministic. In a non-limiting example, the in-vehicle machine learning model is a gradient descent algorithm.

A deterministic algorithm is an algorithm that, given a particular input, will always produce the same output, with the underlying machine always passing through the same sequence of states. Formally, a deterministic algorithm computes a mathematical function; a function has a unique value for any input in its domain, and the algorithm is a process that produces this particular value as output.

The cloud-based probabilistic controller includes a probabilistic advanced cruise controller (PACC), which is communicatively coupled to the in-vehicle deterministic controller. In a non-limiting example, a probabilistic algorithm of the PACC may be include a Gaussian process, a Bayesian inference process, or a combination of the Gaussian process and the Bayesian inference processes.

The in-vehicle deterministic control override algorithm overrides the probabilistic algorithm under unsafe situations.

The deterministic controller in the ego vehicle monitors for uncertain situations, such a sudden deceleration of a vehicle directly in front of the ego vehicle, which is determined by splitting an overall gap between a leading vehicle and the ego vehicle into a personalized gap and an emergency collision gap calculated by the deterministic algorithm.

In a default driving condition, the overall gap between the ego vehicle and surrounding vehicles is maintained based on a desired acceleration, $A_{des}$, based on the personalized driver profile derived by the probabilistic algorithm. The deterministic controller includes a deterministic override algorithm which calculates the emergency collision gap from sensor data gathered by the ego vehicle, such as LIDAR, radar, speed sensors, braking sensor, and the like, and triggers the override function when the gap in front of the ego vehicle is compromised by other vehicles or situations. In a non-limiting example, a driver may set a personalized preference gap of 20 feet to be maintained between his (ego) vehicle and a vehicle directly in front of his vehicle (a leading vehicle). If the system determines that the overall gap will decrease to a distance less than 20 feet, the deterministic override algorithm is triggered. The emergency collision gap is determined by the deterministic controller as described below.

In FIG. 1A, the hybrid ADAS system is illustrated. A cloud based probabilistic controller 120 has at least one processor which includes a data processor 126 and a trained machine learning algorithm 128. A probabilistic personalized adaptive cruise (PACC) controller 121 is operatively connected with the trained machine learning algorithm 128. The trained machine learning algorithm 128 may be a Gaussian Process, a Bayesian inference algorithm or a fuzzy logic algorithm which has been trained using historical driving data stored in the memory. The output of the trained machine learning algorithm 128 is a personalized acceleration profile, which is determined based on correlating the historical driving data, a driver profile, driver personalized gap inputs, and driving habits of the driver with the overall gap, the emergency collision gap, a velocity, $V_L$ of the leading vehicle, a position of the ego vehicle, $P_E$, and a position of the leading vehicle, $P_L$. The personalized PACC controller generates a desired acceleration, $A_{des}$, from the personalized acceleration profile.

Vehicle data 122 is a database memory which stores personalized gap information set by the driver of the ego vehicle 100. A cloud-vehicle management (CVM) device 124 is a communications device which bi-directionally transmits and receives data and commands to and from a cloud-vehicle management (CVM) device 114 of a deterministic controller 110. The desired acceleration, $A_{des}$, is sent by the cloud-vehicle management device 124 to the cloud-vehicle management device 114.

The deterministic controller 110 located in an ego vehicle 100 includes a vehicle control device 112 that receives radar and LIDAR readings the ego vehicle takes periodically with on-vehicle radar scanners and LIDAR sensor(s). These readings are analyzed to determine the overall gap 108 between the ego vehicle 100 and the leading vehicle 101 (or any intervening vehicle, see FIG. 3C), and are also sent to the cloud based probabilistic controller 120. If the ego vehicle 100 has not entered the emergency collision gap 106, the cloud based probabilistic controller 120 transmits personalized acceleration control signals, i.e., the desired acceleration, $A_{des}$, from the cloud-vehicle management (CVM) device 124 to the cloud-vehicle management (CVM) device 114 of the deterministic controller 110. The deterministic controller 110 then uses the desired acceleration, $A_{des}$, to control the braking, acceleration, and deceleration of the ego vehicle. When the radar and LIDAR readings indicate that personalized gap 104 is equal to or less than the emergency collision gap 106, the deterministic override algorithm shifts control to the deterministic controller 110. Once the personalized gap 104 is greater than the emergency collision gap 106, the deterministic override algorithm shifts the control back to the cloud based probabilistic controller 120.

In a non-limiting example, if the gap between the ego vehicle and the leading vehicle is 20 feet, and the ego vehicle's stopping distance is 30 feet at the given speeds of the two cars, then a collision is likely in the case of a sudden braking action of the leading car. Based on sensors, the ego vehicle will assess conditions where the braking distance is smaller than the gap and the ADAS system will override the probabilistic controller and slow down the ego vehicle. If another car cuts in the gap between the leader and the follower, the sensors will detect the new shortened distance between the ego vehicle and the cut-in car, and again slow down the ego vehicle. In addition, in both cases, the system will trigger the override function to give control to the deterministic controller from the probabilistic controller.

Figure 1B:
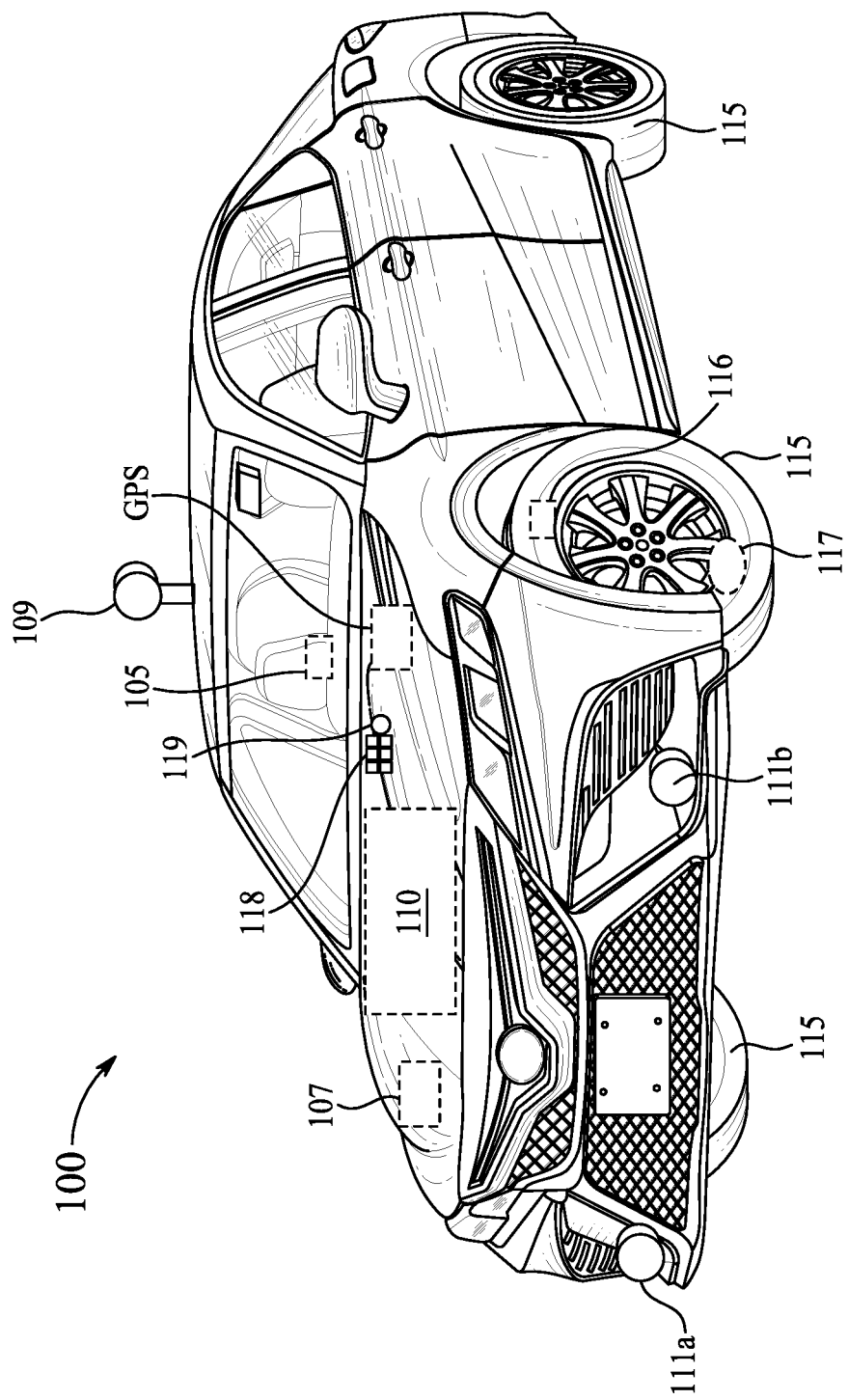
FIG. 1B illustrates a vehicle with an adaptive cruise control system, according to certain embodiments.

FIG. 1B illustrates an example of a vehicle having a deterministic controller 110, such as the ego vehicle 100 of the present disclosure.

FIG. 1B illustrates the ego vehicle 100 including tires 115, a brake sensor 116, located within each tire, a brake 117, associated with each tire, (brakes, one of which is shown as a dotted oval on a tire 115, are located on a tire hub and engage with a disc within the tire), a deterministic controller 110, a throttle 118, located within the engine compartment and a throttle sensor 119. The ego vehicle is also equipped with a plurality of radar scanners (111a, 111b) on the front and rear of the vehicle (rear radar not shown), and at least one LIDAR sensor 109, located on the roof of the vehicle. The LIDAR sensor may be on a rotating turret (not shown) or there may be a plurality of LIDAR sensors directed to capture a 360 degree view of a surrounding environment. The locations illustrated of the brakes, brake sensors, throttle, throttle sensor, deterministic controller, radar scanners and LIDAR sensor are for illustrative purposes only. The brakes, brake sensors, throttle, throttle sensor, deterministic controller, radar scanners, and LIDAR sensor may be located at any location on or within the vehicle with respect to manufacturing and design constraints. Data from the brake sensors, throttle sensor, radar scanners, and LIDAR sensor may be communicated directly to the vehicle control device 112. The vehicle may have a plurality of other sensors 107, which measure any of vehicle velocity, $V_E$, yaw, pitch, roll, tire pressure, and the like, which are connected to electronic control units, ECUs, (not shown) within the vehicle. The sensor data may include digital data that describes one or more sensor measurements generated by the sensor set of the ego vehicle 100. For example, the sensor data may include digital data that describes a velocity and an acceleration or deceleration of the ego vehicle 100. In another example, the sensor data may include digital data that describes a relative position between the ego vehicle 100 and the leading vehicle 101 or another vehicle measured by one or more range finding and position locating sensors such as LIDAR, radar, and the like. Data from these other sensors 107 may be communicated to the vehicle control device 112 from the ECUs.

The ego vehicle 100 may also include a global positioning antenna, which receives global positioning signals), to determine position coordinates, $P_E$, of its location. The deterministic controller may use the velocity, $V_E$, the position coordinates, $P_E$, and the radar and LIDAR measurements to determine a position, $P_L$, and a velocity, $V_L$, of the leading vehicle. A computer interface 105 may be a keypad or touch screen of a computer display located on a dashboard of the vehicle.

The deterministic controller 110 is a computing device including circuitry and one or more processors, such as the data processor 113 and a processor which executes the deterministic algorithm. The processors can include at least one hardware circuit (e.g., an integrated circuit) configured to carry out instructions contained in program code. In arrangements in which there is a plurality of processors, such processors can work independently from each other or one or more processors can work in combination with each other. In one or more arrangements, the processor can be a main processor of the vehicle 100. For instance, the processor can be an engine control unit (ECU).

The processors of the deterministic controller 110 may execute a deterministic algorithm which correlates data from the tire sensors 115, brake sensors 116, tire pressure sensors, throttle sensor 119, radar and LIDAR sensor readings, and other vehicle sensors 107 to determine the emergency collision gap 106. For example, the deterministic algorithm may perform a clustering analysis on this data to determine the emergency collision gap 106. Based on records from the historical database, the data readings from the tire sensors and brake sensors can indicate when a braking event previously occurred. Combined with radar and LIDAR sensor readings based on the same time stamp, the deterministic controller can identify how far away from the lead vehicle the ego vehicle needs to be when the ego vehicle starts to brake. These distance values can be compared with those of near-crash events, so a clustering algorithm can be applied and compute the value for the emergency collision gap.

The ego vehicle 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be operatively connected to the processor for use thereby. The term "operatively connected," as used throughout this description, can include direct or indirect connections, including connections without direct physical contact.

The deterministic controller 110 includes a computer-readable medium comprising program instructions executable by the processors to cause the deterministic controller 110 to receive image data from any one of the LIDAR sensors 109 and radar scanners (111a, 111b) and analyze the image data to form a view of an environment surrounding the ego vehicle. The view is used to determine the gap distance between the ego vehicle 100 and the leading vehicle 101, an interfering vehicle 103 (see FIG. 3C), or a surrounding vehicle (see FIG. 3D).

Figure 2:
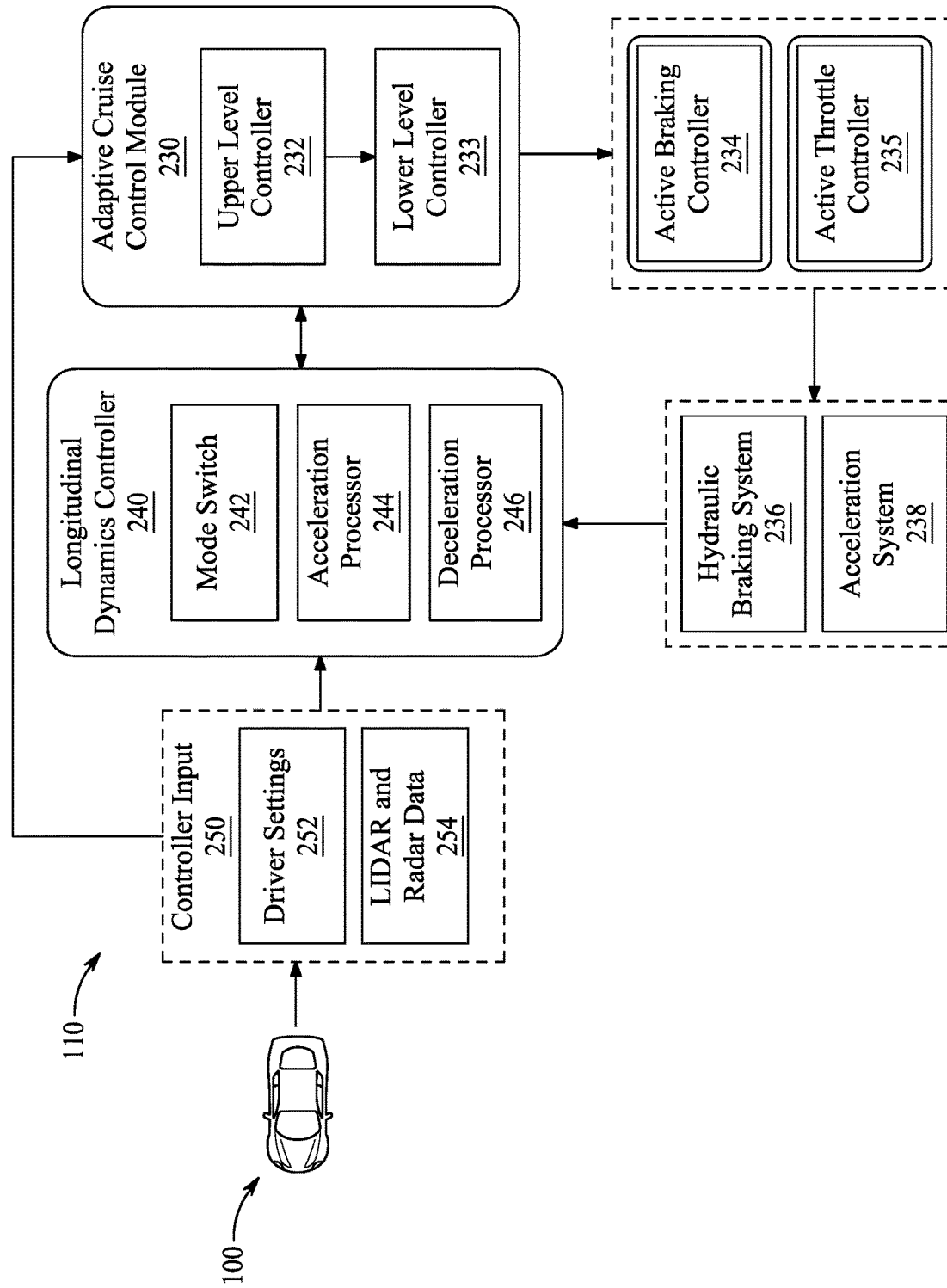
FIG. 2 illustrates a deterministic controller, according to certain embodiments.

FIG. 2 illustrates the deterministic controller 110, which is located in the ego vehicle 100. Inputs to the deterministic controller 110 are received at controller input 250. Driver settings 252 are received from settings stored in the deterministic controller or from the vehicle data device 112 of the cloud based probabilistic controller 120 (See FIG. 1). Radar and LIDAR sensors of the ego vehicle 100 record a distance of the leading vehicle 101 from the ego vehicle 100 as a series of measurements, which are received at the controller input 250 as LIDAR and radar data 254. From the series of measurements, the deterministic controller 110 can determine the distance between the ego vehicle 100 and the leading vehicle 101 or any intervening vehicles 103 (see FIG. 3C) using time of flight calculations. The deterministic controller can also use the measurements to determine a distance from any surrounding vehicle (for example, vehicle 105 of FIG. 3D). Additionally, from the series of measurements, the deterministic controller can determine a relative velocity between the ego vehicle 100 and other vehicles (101, 103, 105) within range of its LIDAR and radar sensors. The emergency collision gap 106 is determined by comparing the velocity $V_E$ of the vehicle 100 to the relative velocity of the leading vehicle 101 or to the relative velocity of an intervening vehicle 103, and may depend on other factors, e.g., weather, separation of the ego vehicle from other vehicles, traffic velocity, traffic volume, accidents and/or road conditions. Data received at the controller input 250 is sent to an adaptive cruise controller 230 and to a longitudinal dynamics controller 240.

Referring back to FIG. 1A and FIG. 1B, the LIDAR sensor 109 calculates how long it takes for beams of light to hit an object or surface and reflect back to a laser scanner. The distance to the object or surface is then calculated by the data processor 113 with respect to the velocity of light. These are known as time of flight measurements. Depending on the sensor used, LiDAR sensors can fire hundreds of thousands of pulses per second, and the measurements can be used to very accurately determine the speed of an object or surface. In the present disclosure, a LIDAR sensor installed in the ego vehicle can determine the relative speeds of the ego vehicle 100 and the leading vehicle 101 (or other vehicles within range of the LIDAR system).

Additionally, radar measurements can be used similarly to LIDAR measurements, to generate relative distance measurements. Radar is especially useful for making measurements at night or when visibility is poor.

According to an embodiment, the radar equipment 111a, 111b uses millimeter wave radar for detecting an object near the ego vehicle, including a leading vehicle 101, and measuring the distance between the ego vehicle and the leading vehicle. Vehicle-based millimeter wave radar equipment mixes transmitted waves (millimeter waves) that are emitted from a transmitter and received waves reflected from the leading vehicle so as to extract a beat frequency in the mixed signal whereby information about a distance between the present vehicle and the preceding vehicle is acquired. This distance information is then outputted to the vehicle control device 112. In an embodiment, information regarding the distance to a preceding vehicle is determined via localization of a centroid of reflected radio waves captured at the receiver. Similar to a heat map, a pixelated rendering of radio wave intensities is generated and a region with the highest intensity is selected as the rear aspect of the preceding vehicle. In another embodiment, information regarding the distance to a preceding vehicle is determined from the waveform peaks of a frequency spectrum as correlated with objects in a field of view.

Data is continuously acquired from the radar equipment 111a, 111b in order to provide real-time data to the vehicle control device 112.

Data processor 113 receives the radar and LIDAR data and calculates the overall gap 108, compares the overall gap to the personalized gap 104 and determines whether the emergency gap 106 has been entered by the ego vehicle.

FIG. 2 illustrates details of the deterministic controller 110. Adaptive cruise controller (ACC) 230 includes an upper-level controller 232, which monitors and controls a following distance between the ego vehicle 100 and the leading vehicle 101 and a lower-level controller 233. The deterministic controller 110 of the ego vehicle 100 provides longitudinal force control signals to an active throttle controller 235 and an active brake controller 234 to achieve longitudinal motion of the ego vehicle 110. The upper-level controller 232, which is a combination of feedforward and fuzzy feedback controllers, determines the longitudinal force control signals needed by the ego vehicle 100 to achieve the desired acceleration $A_{des}$ received from the probabilistic controller 120. The upper-level controller is a PID controller. A proportional-integral-derivative controller (PID controller or three-term controller) is a control loop mechanism employing feedback that is widely used in industrial control systems and a variety of other applications requiring continuously modulated control. The PID controller continuously calculates an error value.

The lower-level controller 233 distributes the longitudinal force control signals to the active throttle controller 235 and the active brake controller 234. The upper-level controller receives the input of the ego vehicle current velocity $V_E$, a velocity $V_L$ of the leading vehicle 101 and the personalized, emergency and collision gaps, and calculates an acceleration command, which it sends to the acceleration processor 244 and/or the deceleration processor 246 in the longitudinal dynamics controller 240.

The lower-level controller 233 outputs a corresponding speed and a desired gap to the active braking controller 234 and the active throttle controller 235, which have been determined by the upper level, PID controller, as mentioned above. The longitudinal dynamics of the ego vehicle are decoupled based on the controller inputs, so instead of having one single processer that handles acceleration and deceleration at the same time, there is an acceleration processor for the acceleration of the ego vehicle, and a deceleration processor for the deceleration of the ego vehicle.

The active braking controller 234 generates braking control signals, which are sent to the hydraulic braking system 236, based on the corresponding speed and desired gap. The active throttle controller 235 generates throttle control signals, which are sent to the acceleration system 238, based on the corresponding speed and gap. The hydraulic braking system 236 and the acceleration system 238 transmit the braking control signals, throttle control signals, brake sensor readings and acceleration sensor readings as a set of feedback signals to the longitudinal dynamics controller 240.

The longitudinal dynamic controller 240 includes a mode switch 242. Based on the inputs received from the controller input 250 and the feedback signals, the longitudinal dynamics controller may actuate the mode switch to switch from control by the cloud based probabilistic controller 120 to the deterministic controller 110 or vice versa.

The deterministic controller 110 may determine the emergency collision gap 106 by determining a safe stopping distance as follows.

Equation (1) describes the personalized gap distance desired by the driver, $d_{des}$, $$d_{des} = T_h V_E \pm d_o \quad (1)$$

where $T_h$ is a time headway, and $d_0$ is the minimum safe distance before the leading vehicle 101 and the ego vehicle 100 can come to a safe stop. The time headway is the a time difference between the ego vehicle 100 and leading vehicle 101 as each crosses a given point. Equation (2) shows the relationship of the vehicle dynamics. The distance error $\Delta d$ and the velocity difference $\Delta V$ are be calculated as follows:

$$\Delta d = d_{es} - d \text{ and } \Delta V = V_L - V_E \quad (2)$$

where d is the overall gap 108, $V_L$ is the velocity of the leading vehicle 101, and $\Delta V$ is the velocity difference.

Referring back to FIG. 1A, the emergency collision gap 106 is the portion of the overall gap 108 in which the deterministic controller 110 of the ego vehicle 100 overrides the cloud based probabilistic controller 120 to control braking and acceleration of the ego vehicle 100 when the ego vehicle determines that that there is a danger the ego vehicle will enter the emergency collision gap 106, due to sudden braking or deceleration of the leading vehicle 101. After the ego vehicle has corrected its velocity, the deterministic controller recalculates the emergency collision gap based on new radar and LIDAR measurements, and generates an updated emergency collision gap. The longitudinal dynamics controller determines whether to continue to invoke, by the mode switch, the override function based on the updated emergency collision gap or release control to the cloud-based probabilistic controller.

FIG. 3A-FIG. 3D illustrate situations where measurements of the emergency collision gap 106 and the personalized gap 104 may trigger the override condition.

Figure 3A:
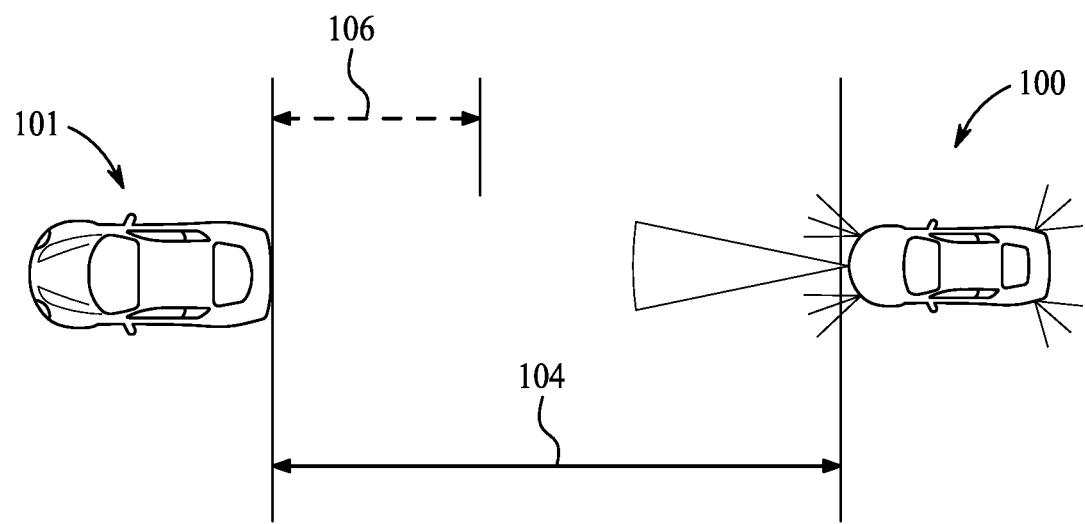
FIG. 3A illustrates a default driving condition, according to certain embodiments.

FIG. 3A illustrates a default driving condition. The default driving condition is managed by the cloud based probabilistic controller 120 based on the personalized gap 104 set by the driver of the ego vehicle 100. In the default driving condition, the overall gap 108 and the personalized gap 104 are equal, as the ego vehicle 100 has not entered the emergency collision gap 106 region.

Figure 3B:
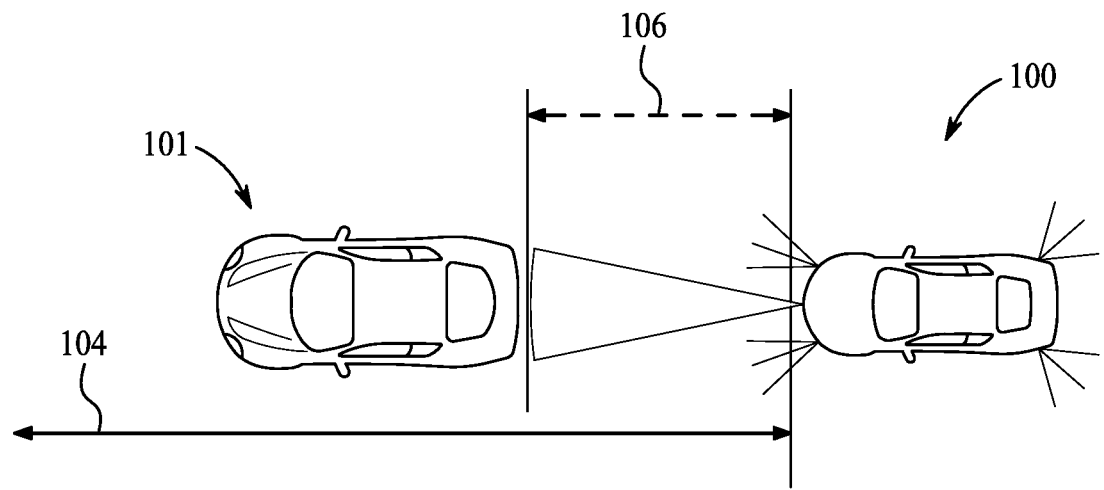
FIG. 3B illustrates a compromised emergency collision gap due to a leading vehicle braking suddenly, according to certain embodiments.

FIG. 3B illustrates the situation when the leading vehicle 101 brakes suddenly. The personalized gap 108 of ego vehicle 100 is compromised by the sudden deceleration of the leading vehicle 101, and the two vehicles are separated only by the emergency collision gap 106. In this situation, the override condition is activated, and the deterministic controller 110 takes over control of the braking and deceleration of the ego vehicle 100.

Figure 3C:
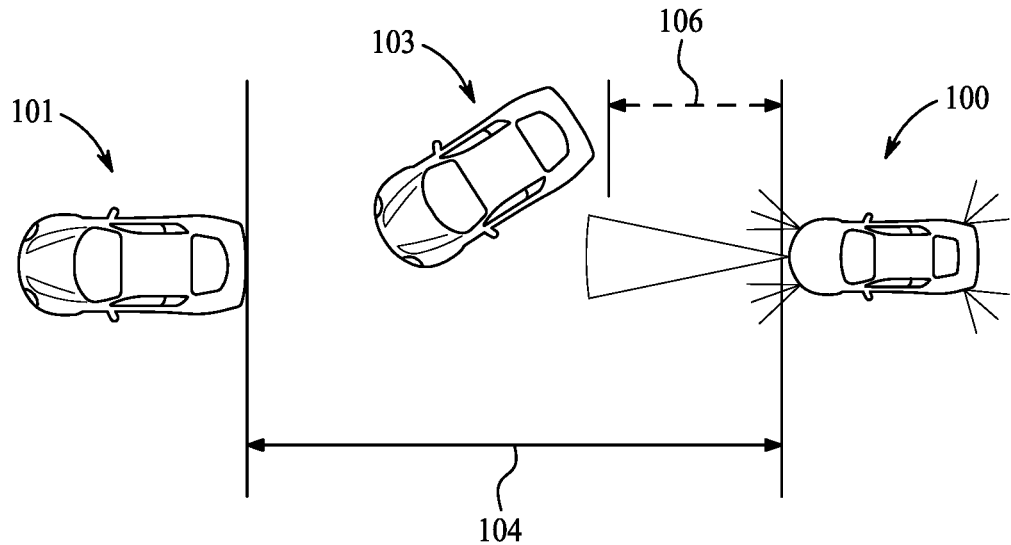
FIG. 3C illustrates a compromised emergency collision gap due to a vehicle cutting-in, according to certain embodiments.

FIG. 3C illustrates an uncertain condition that results when a vehicle 103 attempts to enter the personalized gap 104 between the leading vehicle 101 and the ego vehicle 100, thus placing the ego vehicle 100 within the emergency collision gap 106 and triggering the override condition.

Figure 3D:
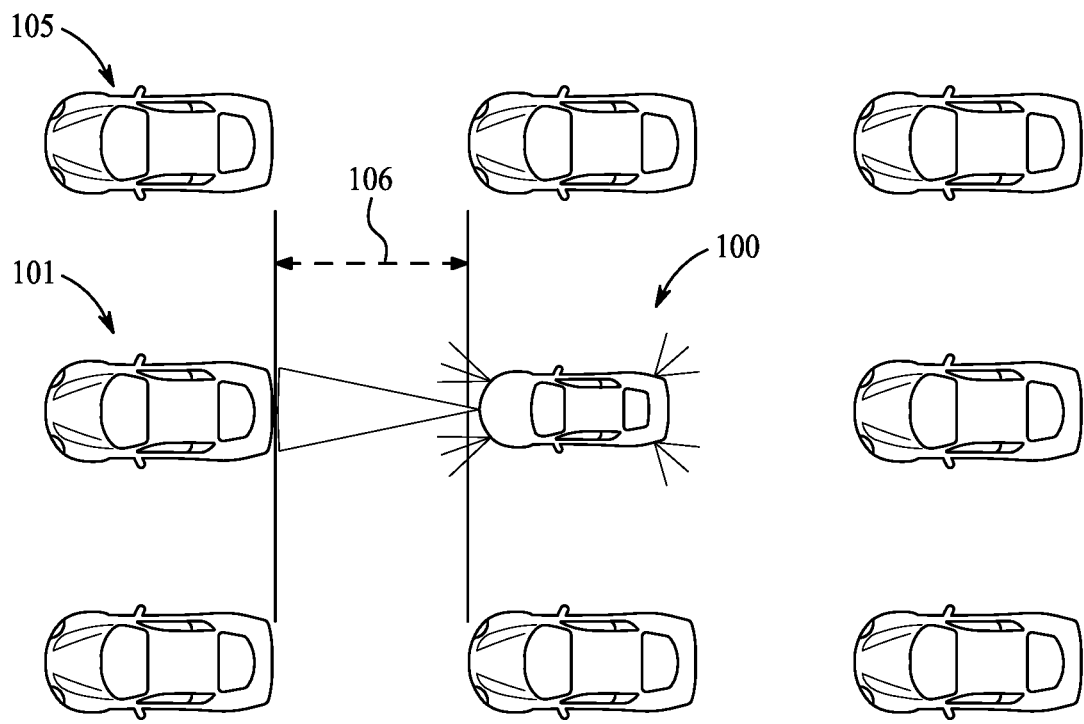
FIG. 3D illustrates a compromised emergency collision gap due to heavy traffic, according to certain embodiments.

FIG. 3D illustrates another uncertain condition when the ego vehicle cannot stay within the personalized gap as the traffic on all sides of the ego vehicle 100 confines the ego vehicle 100 into the emergency collision gap 106. In this situation, the deterministic controller 110 activates the override condition and controls the braking, acceleration, and deceleration of the ego vehicle.

Figure 4:
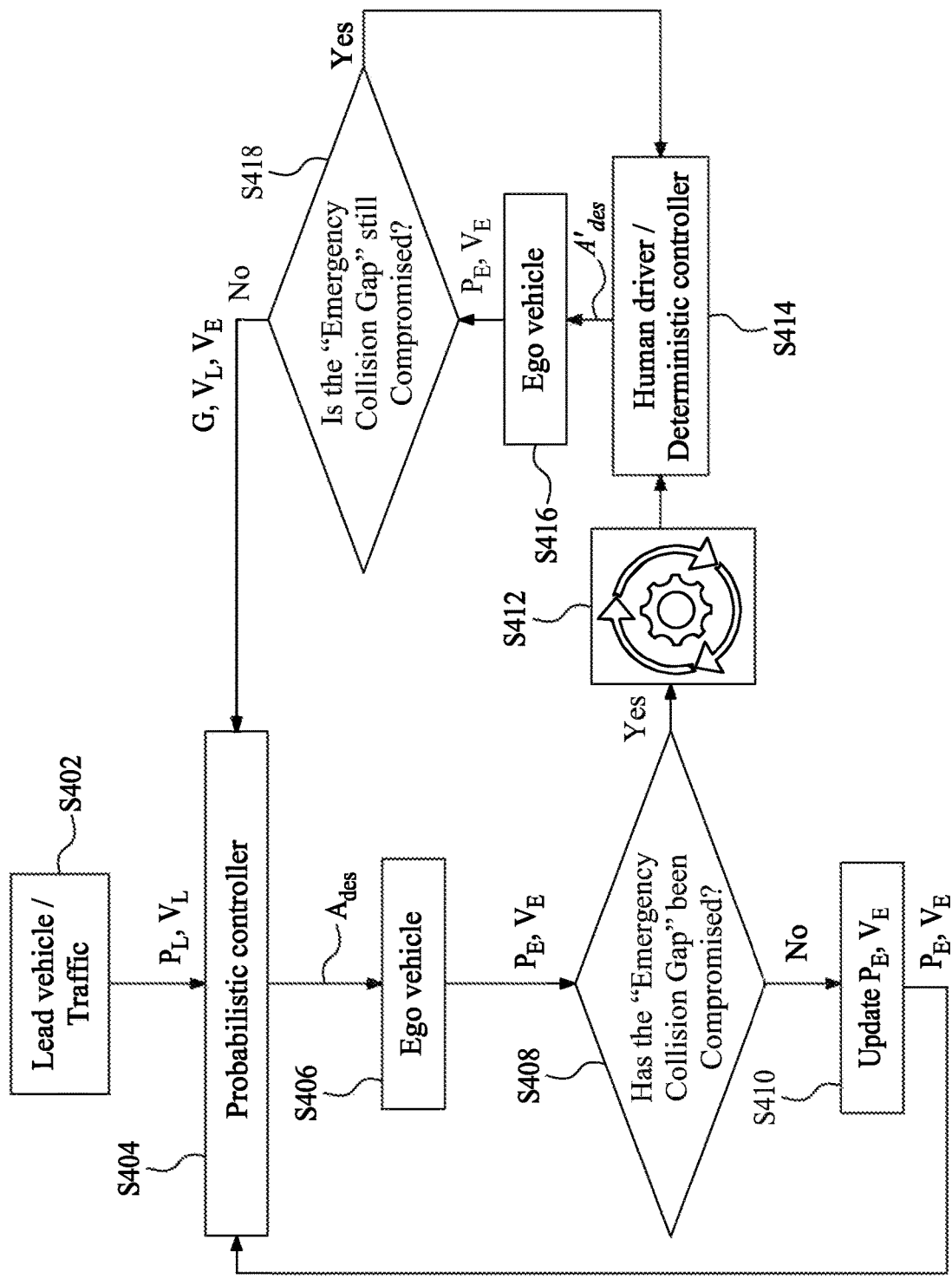
FIG. 4 is a flowchart illustrating ADAS with an override function, according to certain embodiments.

FIG. 4 is a flowchart showing the override function process in the hybrid system including both the deterministic ADAS system and the probabilistic ADAS system. The deterministic ADAS system takes over whenever the ego vehicle detects a compromise to its safety. Otherwise, the probabilistic system works as the default ADAS system.

At step S402, the position, $P_L$, of the leading vehicle 101, the velocity $V_L$, of the leading vehicle (or the speed of the traffic) and overall gap (between the ego vehicle 100 and a leading vehicle 101 or intervening vehicle 103) are determined by radar and LIDAR readings made by the ego vehicle 100 and transmitted to the cloud based probabilistic controller 120. The cloud based probabilistic controller 120 also receives a position, $P_E$, speed, $V_E$, of the ego vehicle, the overall gap and the emergency collision gap as measured by the deterministic controller 110 of the ego vehicle 100.

At step S404, the cloud based probabilistic controller 120 receives the emergency collision gap from the ego vehicle 100, and outputs a desired acceleration, $A_{des}$, as previously described with respect to FIG. 1A The desired acceleration, $A_{des}$, is transmitted by the cloud-vehicle management system 124 of the cloud based probabilistic controller 120 to the cloud-vehicle management system 114 of the ego vehicle 100 (See FIG. 1A).

At step 406, the ego vehicle 100 receives the desired acceleration $A_{des}$.

At step 408, the deterministic controller 110 of the ego vehicle determines whether the emergency collision gap 106 has been compromised. If the emergency collision gap 106 has not been compromised, at step S410 the vehicle control device 112 of the ego vehicle 100 sends its position, $P_E$, and velocity, $V_E$ back to step 404 as feedback to the cloud based probabilistic controller 120. The upper level controller 232 sends braking and throttle control signals based on the desired acceleration, $A_{des}$, to the lower level controller 233 to control the brakes and throttle positions of the ego vehicle.

However, if the deterministic controller 110 of the ego vehicle at step S408 determines that the emergency collision gap 106 has been compromised, at step S412 the override function is invoked, by the mode switch 242, to switch control to the deterministic controller 110.

At step S414, the deterministic controller calculates a new desired acceleration, $A_{des}$ (or deceleration) needed to prevent the ego vehicle from impacting the leading vehicle 101 or an intervening vehicle 103. The new desired acceleration $A'_{des}$ is used by the adaptive cruise controller 230 to generate control signals for the hydraulic braking system 236 and the acceleration system 238, as shown in FIG. 2. Alternatively, a human driver may take control of the acceleration, deceleration and braking of the ego vehicle, and return the ego vehicle to control by the probabilistic controller 120 when the emergency collision gap 106 is no longer compromised.

At step 416, the ego vehicle then sends its new position, $P_E$ and velocity, $V_E$, to the longitudinal dynamics controller 240, which sends the new position, $P_E$ and velocity, $V_E$ to the upper level controller 232.

At step S418, the upper level controller 232 determines whether the emergency collision gap is still compromised. If YES, control is returned to step S414 to recalculate the new desired acceleration, $A'_{des}$. If the emergency gap is no longer compromised, the deterministic controller calculates a new emergency collision gap based on the current overall gap and the mode switch 242 returns control to the cloud based probabilistic controller 120 in the cloud 150. The deterministic controller transmits the new emergency collision gap 106, the velocity of the ego vehicle, $V_E$, and the velocity of the leading vehicle, $V_L$, to the cloud based probabilistic controller 120 at step S404 to continue monitoring the personalized gap 104 between the vehicles.

The present disclosure aims to solve the problem of modern, probabilistic ADAS systems dealing with uncertain and/or compromised situations that could lead to accidents. A deterministic override solves the problem of keeping modern vehicles safe while at the same time providing the value of naturalistic driving, e.g., gap preferences, offered by AI systems.

Given the history of unintended acceleration and sudden acceleration, it is important to ensure that any fuzzy factors do not appear to cause accidents. As vehicles transition to being software first and real-time data driven, the hybrid solution of the present disclosure offers a factor of safety to any probabilistic ADAS system by overriding the functionality of probabilistic systems under uncertain and/or unsafe situations.

Figure 5:
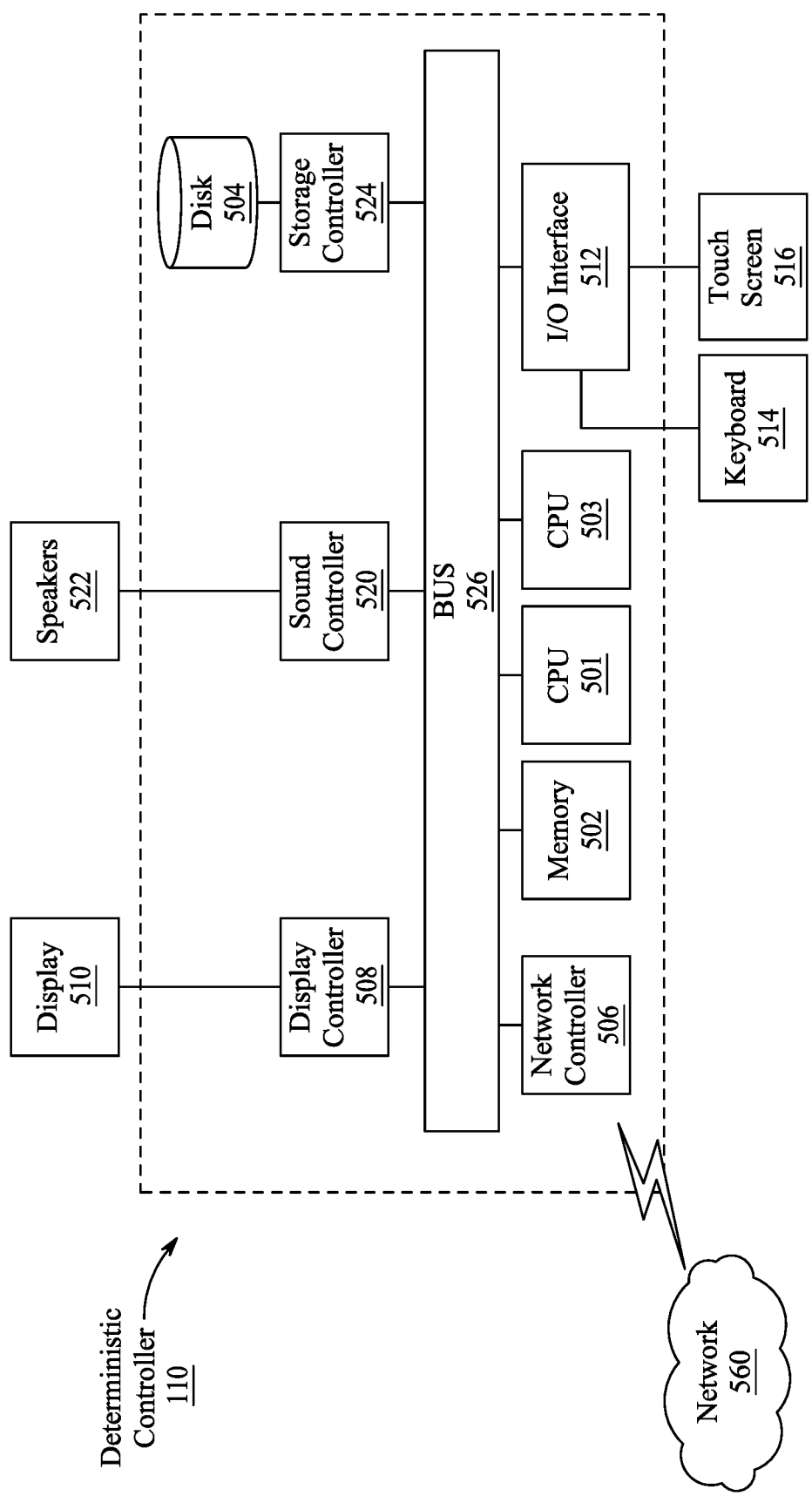
FIG. 5 is an illustration of a non-limiting example of details of computing hardware used in the deterministic controller, according to certain embodiments.

Next, further details of the hardware description of the computing environment of the deterministic controller 110 according to exemplary embodiments is described with reference to FIG. 5. In FIG. 5, the deterministic controller 110 is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 10, UNIX, Solaris, LINUX, and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, representative of cloud-vehicle management device 114 of FIG. 1A, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can be a cellular network including EDGE, 3G, 4G and 5G wireless cellular systems. The wireless network can also be WiFi or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard as well as a touch screen panel 516 on or separate from display 510. The keyboard and touch screen panel 516 may be located on a dashboard of the ego vehicle (not shown).

A sound controller 520 is also provided in the computing device such as Sound Blaster X-Fi Titanium from Creative, to interface with speakers/microphone 522 thereby providing sounds and/or music. The speakers/microphone 522 are mounted within a passenger compartment (not shown) of the ego vehicle.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for controlling an ego vehicle equipped with advanced driver assistance, comprising:
receiving an input of a personalized gap of the ego vehicle;
determining an emergency collision gap between the ego vehicle and a leading vehicle;
when the personalized gap is greater than the emergency collision gap, controlling the ego vehicle by a cloud based probabilistic controller; and
when the emergency collision gap is greater than or equal to the personalized gap, overriding the cloud based probabilistic controller and controlling the ego vehicle by a deterministic controller of the ego vehicle.

2. The method of claim 1, further comprising:
determining an overall gap from a series of radar and LIDAR measurements made by the ego vehicle;
determining a position of the ego vehicle;
calculating, using at least two successive measurements of the series of radar and LIDAR measurements, a velocity of the leading vehicle and determining, by a deterministic controller of the ego vehicle, the emergency collision gap from the overall gap, a velocity of the ego vehicle, and the velocity of the leading vehicle; and
transmitting the personalized gap, the overall gap, the emergency collision gap, the velocity of the leading vehicle, the velocity of the ego vehicle, and the position of the ego vehicle to the cloud based probabilistic controller.

3. The method of claim 2, further comprising:
correlating by the probabilistic controller, the personalized gap, the overall gap, the emergency collision gap, the velocity of the leading vehicle, the velocity of the ego vehicle, the position of the ego vehicle, and a position of the leading vehicle with a driver profile and historic driving habits of a driver of the ego vehicle;
generating, by the cloud based probabilistic controller, a desired acceleration based on the correlating;
transmitting, by a cloud-vehicle management communication device of the cloud based probabilistic controller, the desired acceleration to the deterministic controller;
calculating, by an upper level controller of the deterministic controller, a first set of braking control signals and a second set of acceleration control signals based on the desired acceleration;
when the personalized gap is greater than the emergency collision gap, the deterministic controller actuating one or more of:
a hydraulic braking system using the first set of braking control signals, and
an acceleration system using the second set of acceleration control signals; and
when the emergency collision gap is greater than or equal to the personalized gap
overriding the cloud based probabilistic controller by invoking an override function.

4. The method of claim 3, further comprising:
generating, by the upper level controller, an acceleration command based on the desired acceleration;
transmitting, by the upper level controller, the acceleration command to a longitudinal dynamics controller including a mode switch, an acceleration processor, and a deceleration processor;
receiving, by the longitudinal dynamics controller, a set of feedback signals from the hydraulic braking system and the acceleration system;
calculating an updated emergency collision gap from a new series of radar and LIDAR measurements made by the ego vehicle;
determining, by the longitudinal dynamics controller, whether to continue to invoke, by the mode switch, the override function based on the updated emergency collision gap;
continuing to override the cloud based probabilistic controller when the override function is invoked: and
returning control to the cloud based probabilistic controller when the override function is not invoked.

5. The method of claim 4, further comprising:
when overriding the cloud based probabilistic controller, determining, by the upper level controller, a desired longitudinal force needed to control the ego vehicle;
transmitting the desired longitudinal force to a lower level controller with the first set of braking control signals, the second set of acceleration control signals, the velocity of the ego vehicle and the overall gap;
outputting, by the lower level controller, the velocity of the ego vehicle, the overall gap and the first set of braking control signals to the hydraulic braking system; and
outputting, by the lower level controller, the velocity of the ego vehicle, the overall gap and the second set of acceleration control signals to the acceleration system.

6. The method of claim 2, further comprising:
receiving, by the cloud based probabilistic controller, the personalized gap and the overall gap from the ego vehicle;
retrieving, from a memory of the cloud based probabilistic controller, a stored historical driving data of a driver of the ego vehicle;
applying the personalized gap, the overall gap, the emergency collision gap, the velocity of the leading vehicle and the velocity of the ego vehicle to a machine learning algorithm and generating a personalized acceleration profile based on the personalized gap, the historical driving data, the overall gap, the emergency collision gap, the velocity of the leading vehicle, the position of the ego vehicle, and the velocity of the ego vehicle;
determining, by a personalized adaptive cruise control algorithm a desired acceleration for the ego vehicle based on the personalized acceleration profile and the overall gap, the emergency collision gap, the velocity of the leading vehicle, and the velocity of the ego vehicle;
generating the desired acceleration; and
transmitting the desired acceleration to the deterministic controller.

7. The method of claim 6, wherein the machine learning algorithm is a Gaussian process algorithm.

8. The method of claim 6, wherein the machine learning algorithm is a Bayesian inference algorithm.

9. The method of claim 1, further comprising:
overriding, by the deterministic controller, the cloud based probabilistic controller when one or more conditions exist, the one or more conditions including
the overall gap is less than or equal to the emergency collision gap;
the personalized gap is greater than or equal to the overall gap; and
the emergency collision gap is greater than the personalized gap.

* * * * *